(No Model.)

5 Sheets—Sheet 1.

E. C. ELLWOOD.
SEED DRILL.

No. 307,185. Patented Oct. 28, 1884.

Witnesses
Wm H Jones
J. T. Wooster

Inventor
Everett C. Ellwood
By atty F. H. Wooster (No Model.)

E. C. ELLWOOD.
SEED DRILL.

No. 307,185.

5 Sheets—Sheet 2.

Patented Oct. 28, 1884.

Witnesses
Wm A Jones
J T Wooster

Inventor
Everett C. Ellwood
By atty F A M Wooster (No Model.)  E. C. ELLWOOD.  5 Sheets—Sheet 3.
SEED DRILL.

No. 307,185. Patented Oct. 28, 1884.

Witnesses
Wm. A. Jones.
J. T. Wooster

Inventor.
Everett C. Ellwood
By atty J. T. M. Wooster (No Model.)   5 Sheets—Sheet 4.

E. C. ELLWOOD.
SEED DRILL.

No. 307,185.   Patented Oct. 28, 1884.

Witnesses,
Wm A. Jones.
J. T. Wooster.

Inventor
Everett C. Ellwood
By atty J. T. Wooster (No Model.)   5 Sheets—Sheet 5.

E. C. ELLWOOD.
SEED DRILL.

No. 307,185.   Patented Oct. 28, 1884.

Witnesses
Wm A. Jones.
J. T. Wooster.

Inventor.
Everett C. Ellwood
By atty
J. T. Wooster

UNITED STATES PATENT OFFICE.

EVERETT C. ELLWOOD, OF GREEN'S FARMS, CONNECTICUT.

SEED-DRILL.

SPECIFICATION forming part of Letters Patent No. 307,185, dated October 28, 1884.

Application filed March 13, 1884. (No model.)

*To all whom it may concern:*

Be it known that I, EVERETT C. ELLWOOD, a citizen of the United States, residing at Green's Farms, in the county of Fairfield and State of Connecticut, have invented certain new and useful Improvements in Seed-Drills; and I do hereby declare the following to be a full, clear, and exact description of the invention, such as will enable others skilled in the art to which it appertains to make and use the same.

My invention has for its object to simplify and improve the construction of this class of devices, and the construction herein shown and described embodies several valuable improvements upon that shown in my former patent, No. 289,520, dated December 4, 1883.

In order that others may understand and use my improved device, I will proceed to describe the same, referring by letters to the accompanying drawings, forming part hereof, in which—

Figure 1:
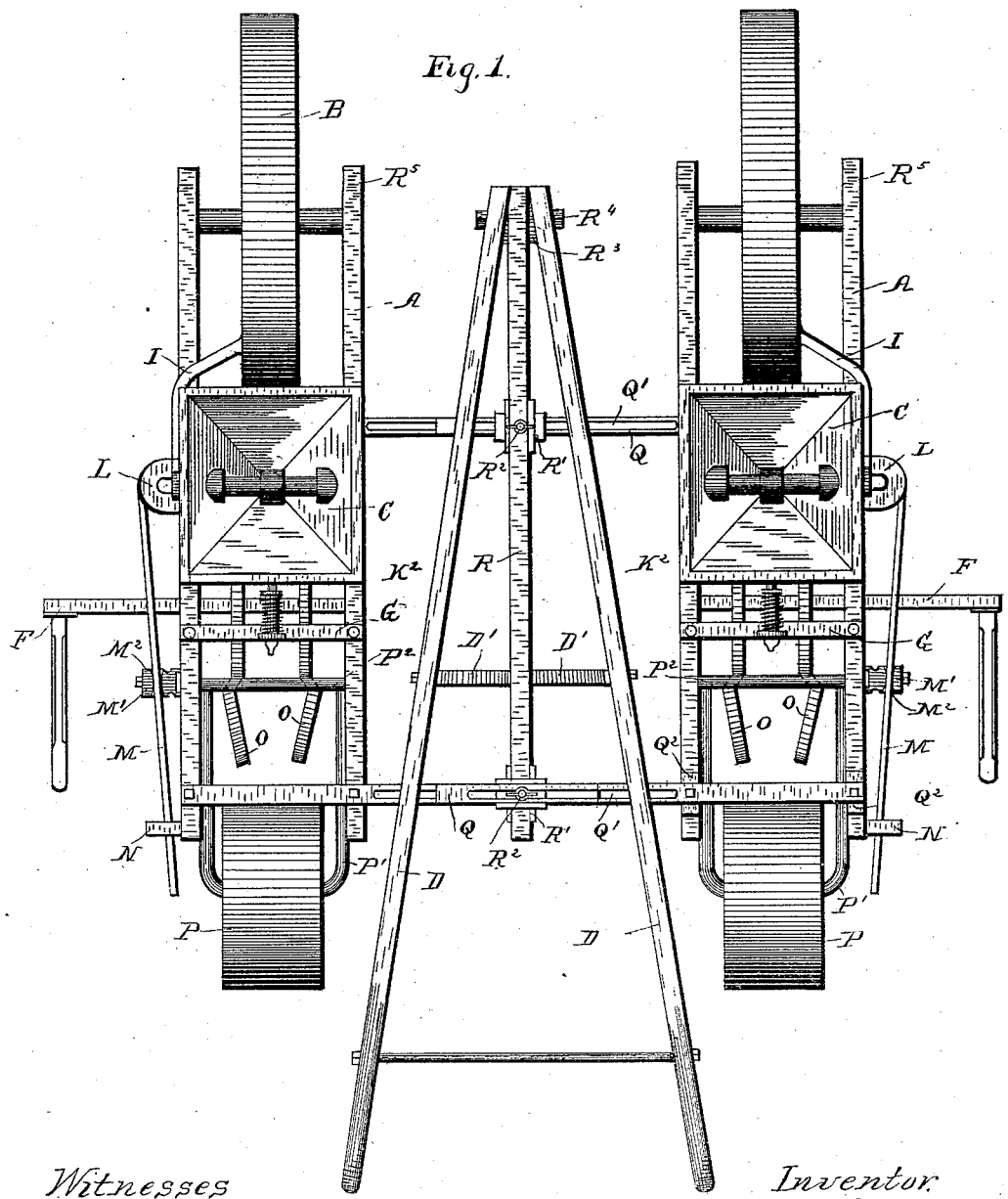
Figure 2:
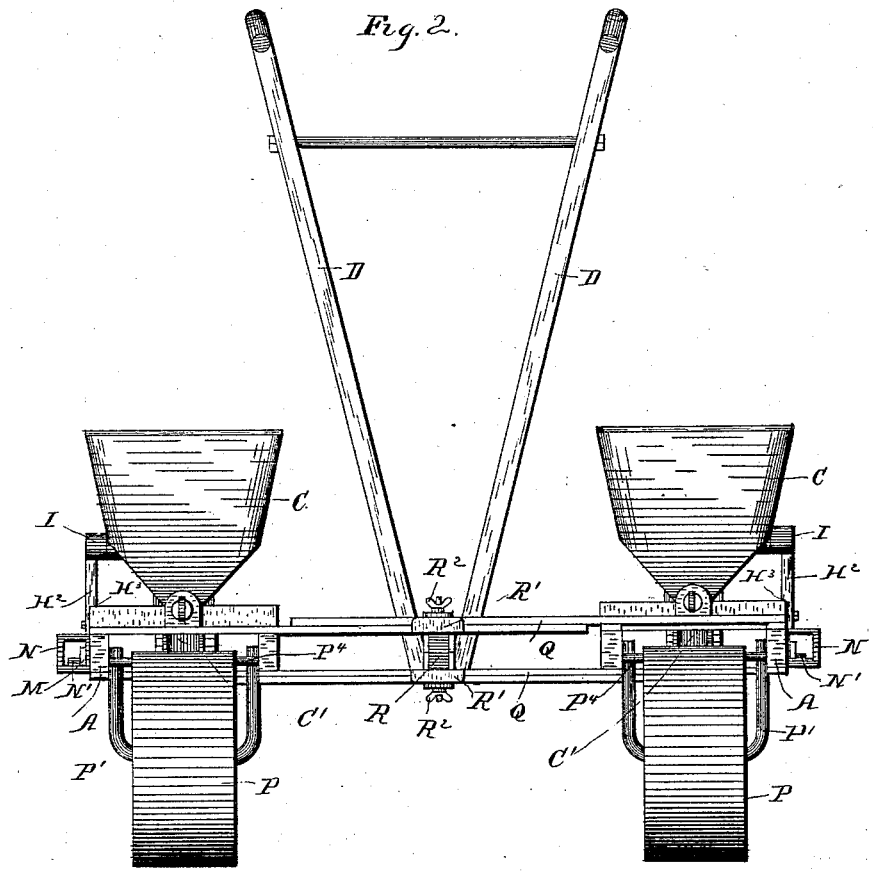
Figure 3:
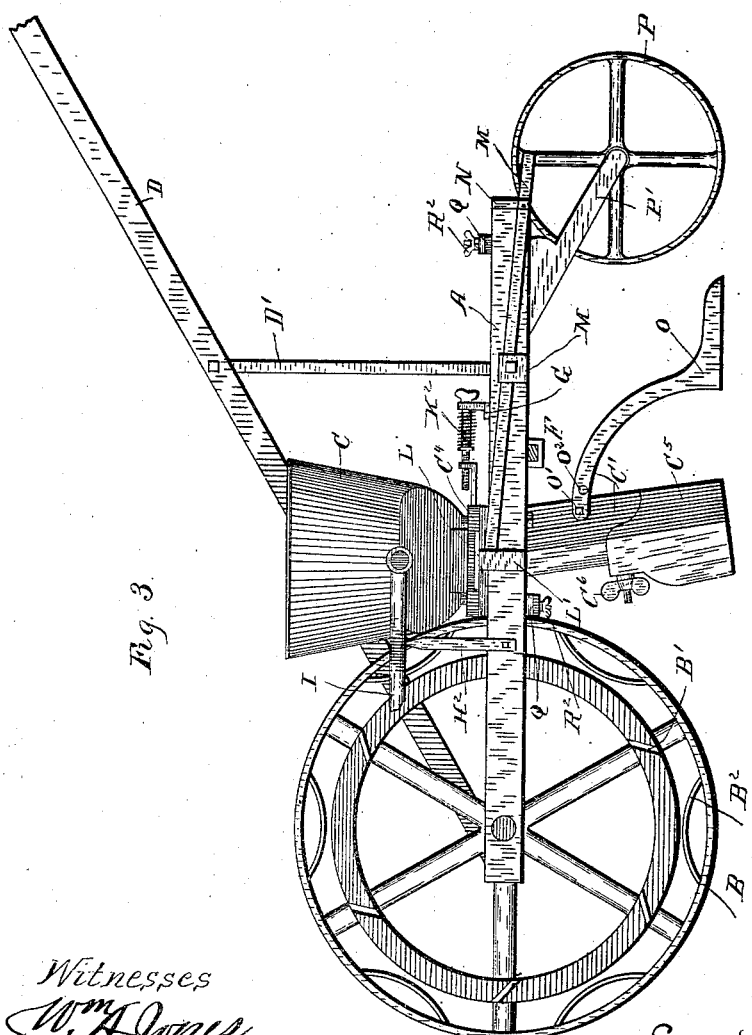
Figure 4:
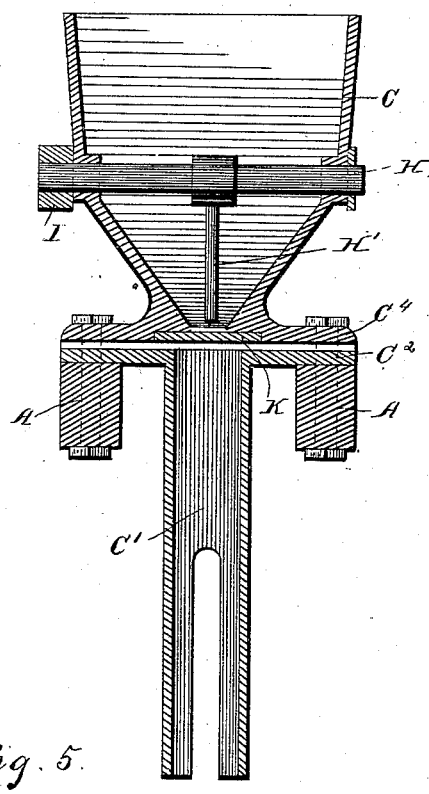
Figure 5:
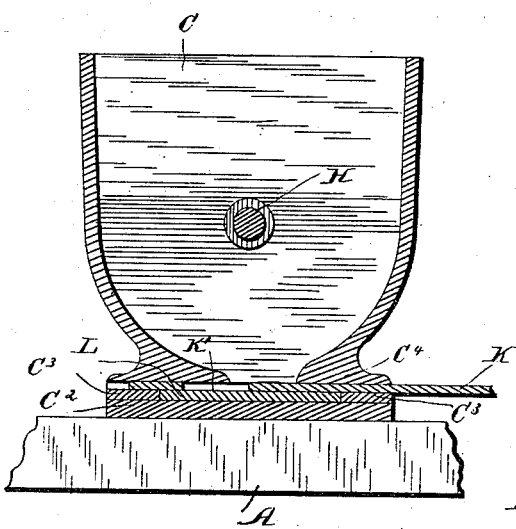
Figure 6:
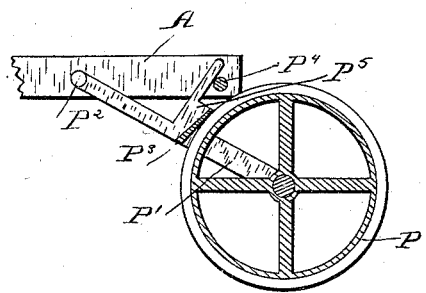
Figure 7:
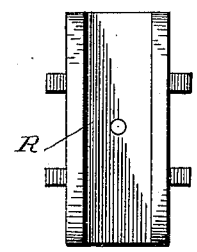
Figure 8:
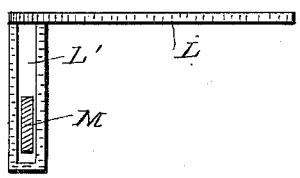
Figure 9:

Figure 1 is a plan view of a double drill embodying my improvements. Fig. 2 is a rear elevation. Fig. 3 is a side elevation. Fig. 4 is a transverse section of the hopper and seed-conveyer. Fig. 5 is a longitudinal section of the hopper, showing the slide and cut-off. Fig. 6 is a section of the presser-wheel and scraper, with one of the side bars in elevation. Fig. 7 is a plan view of one of the guides. Fig. 8 is a side elevation of the cut-off with the operating-lever in section; and Fig. 9 is a reverse side elevation of the agitator-lever, showing the lug which engages the wheel.

Similar letters denote like parts in all the figures.

A A are side bars, to which the operative parts are attached. B B are the main wheels, journaled in the side bars at the front of the machine; C C, hoppers; C' C' conveyers; D D, handles; F F, the furrow-markers; G G, the cross-bars; H H, the agitators, and I I the agitator-levers. The agitators consist of shafts pivoted in the hoppers at right angles to the side bars, and having one or more radial arms, H', which reach nearly to the bottom of the hopper, and act to continually stir the seed. One end of the shaft projects outside of the hopper sufficiently far to permit the agitator-lever to be rigidly attached to it. This lever projects forward, and is bent inward around the angle of the hopper, and its forward end so constructed as to engage the main wheel, as will be more fully explained. The main wheel is provided upon its spokes, or upon an inner strengthening-ring cast integral therewith, with a series of lugs or lifters, B', which are set at an angle to a radius of the wheel. $B^2$ represents a series of cams upon the inner side of the rim or tire of the wheel. These cams are equal in number to the lugs, and are located midway between them. Upon the end of the agitator-lever is a lug, I', turned at an angle thereto, which is adapted to be engaged and thrown by both the lifters and the cams to vibrate the agitator-arm within the hopper. In practice the parts are so constructed that lugs I' and the lifters are substantially parallel when in engagement, thus avoiding unnecessary friction. The operation of this portion of my invention is as follows: As the drill is moved forward, the main wheel of course is rotated from right to left, thus causing the lug on the lever to strike the lifters upon the lower portion of their upper faces and slide up the incline, throwing the lug nearly to the rim of the wheel, in which position it is struck by the curved cams $B^2$ and thrown back again, so that the lever and agitator arm or arms are kept continually in motion. When the drill is not actually sowing seed, however, it is unnecessary that the agitator should be kept in motion. I have therefore provided a lever, $H^2$, pivoted to the side rail, the point of which engages in a notch, $I^2$, in the agitator-lever, and acts to hold said lever in such a position that when the main wheel is rotated lug I' lies between the lifters and the cams, just clearing both, so that the wheel may be rotated without moving the agitator. A lug, $H^3$, upon the inner side of lever $H^2$ engages with the top rail to hold said lever from dropping down when it is not in use. Below the hopper and working in suitable guides is the slide K, having an aperture, K', by means of which the quantity of seed allowed to pass into the conveyer is regulated. A graduated scale is provided either on the plate or upon the hopper itself, by means of which the slide is readily adjusted to sow different kinds of seed, or different quantities of any kind of seed, without the bother of tentative adjustment. Plate K is adjusted by means of a threaded rod, $K^2$, journaled in cross-bar G. Underneath this slide is a plate, L, also sliding in suitable bearings, which I term the "cut-off." The bearings or ways for the cut-off may be cast in plate $C^2$, which is cast integral with the conveyer, and secured to the side bars; or separate strips $C^3$, extending across between the side bars, may be used, said strips being held by the bolts passing through the feet $C^4$ of the hopper. This cut-off projects out beyond the hopper at one side of the machine, and is provided with a depending metallic loop, L', which receives and allows full play to the end of cut-off operating-lever M. This lever is pivoted loosely in a bracket, M', (which also receives the handle-brace D' when either machine is used as a single drill,) and extends backward, its end projecting beyond the side bar. A single bolt through the bracket and side bar secures both cut-off lever and handle-brace, when used. The channel $M^2$ in the bracket has flaring ends, (see Fig. 1,) which allows free lateral as well as vertical swing to the cut-off lever. Near the rear end of the side bar is a keeper, N, in which the end of the cut-off lever rests. This keeper is provided with a central lug, N', thus forming two notches, in which the cut-off lever may rest. It should be understood that the cut-off lies close under the adjusting-slide, so that I am enabled to instantly cut off the entire flow of seed, thus preventing great waste when turning at the ends of the rows, rendering it unnecessary to interfere with the adjustment of the slide in going to and from the field.

The operation of the cut-off will be readily understood from Figs. 1 and 2. The cut-off lever being pivoted near its center, it is apparent that by placing the rear end in the inner notch, as shown, the cut-off will be moved out, thus allowing the seed to flow. To cut off the flow of seed it is only necessary to lift the lever over lug N' and drop it into the outer notch. This will force the cut-off inward, causing it to pass under the seed-opening in the bottom of the hopper and the corresponding opening in the slide, thus cutting off absolutely the flow of seed. The cut-off lever, arranged in the manner shown, may be conveniently operated either by foot or by hand.

The seed-conveyers C' are of ordinary construction, and adjustably secured thereto are the ordinary shares, $C^5$, which may be raised or lowered according to the depth at which it is desired to deposit the seed.

$C^6$ is the set screw, which retains the share in proper position, either the share or the conveyer having a slot through which the set-screw passes.

O O are the coverers. These are loosely pivoted to the conveyer above the share, a single bolt, O', serving to hold them. By making the coverers independent of each other, instead of in one casting, I secure very much better results in uneven ground. the seed being covered evenly even where the ground is rough. A lug or pin, $O^2$, upon the inside of the coverer-shanks, near the pivotal points, engages the edge of the conveyer and prevents the coverers from dropping down too far when the handles are raised.

P is the ordinary roller at the rear of the machine, for pressing the soil down upon the seeds that have been sown. The face of this roller may be either plain or concave, as may be most desirable.

P' is a frame in which roller P is journaled. At its forward end are trunnions (not shown) which turn freely in the side bars, as at $P^2$.

$P^3$ is a cross-piece in frame P', which acts as a scraper to clear the surface of the roller.

$P^4$ is a cross-rod between the side bars at the rear of the machine, which is made adjustable by a series of holes in the side bars, or in any suitable manner.

$P^5$ $P^5$ are notched lugs on each side of the frame, which engage the cross-rod, the rod being embraced by the angles of the notch. When the handles are lowered, the cross-rod rests on the lower face of the notch. Bearing down on the handles will then raise the forward wheel from the ground, in which position the drill may be moved forward, backward, or turned without moving the agitator, as the rear roller or rollers only is in contact with the ground. When the handles are raised, the roller drops until the upper face of the notch rests on the cross-rod, which prevents the roller from dropping down in the way. The adjustment of the cross-rod in connection with the adjustment of the share at the lower end of the conveyer determines the depth at which the seed are sown, and by pivoting the roller in a swinging frame, instead of rigidly to the side bars, I cause the seed to be deposited at substantially a uniform depth, as the drill is but slightly affected by the irregularities of the surface.

Q Q are adjusting-bars firmly bolted to the side pieces, one pair to the upper side, the other pair to the lower side thereof. Each bar is provided with a longitudinal slot, Q'. These bars are placed at right angles to the side bars, and are arranged, by means of blocks $Q^2$ or in any simple manner, so that one bar at both front and rear passes over the other.

R is a central bar, to which the handle-braces D' are pivoted, and which is provided with guides R', securely attached thereto. These guides have grooves or channels in which the central bar rests and transversely thereto guides in which the adjusting-bars rest, one pair of adjusting-bars being secured above the cross-bar, the other pair below it, as shown. Set-screws $R^2$ pass through the slots in the adjusting-bars and engage in the guides and in the central bar, thereby securing the two independent drills at any distance apart to which they may be adjusted.

It will be observed that both the central and the adjusting-bars are rigidly held in the guides, so that no twisting about or lagging of either machine can take place.

In use I provide the adjusting-bars with a graduated scale, so that it is easy to adjust the two machines at any desired distance apart.

At the forward end of the central bar is a casting, R³. A single bolt, R⁴, passes through this casting, the central bar, and the two handles to hold them securely together, as in Fig. 1.

When it is desired to use either machine as a single drill, the handles and the adjusting-bars are detached, the handles are pivoted to the side bars in front of the main wheel at point indicated by R⁵, and the handle-braces are pivoted one in bracket M' and the other to the side bar directly opposite thereto.

I do not desire to limit myself to the exact construction shown, as it will be apparent that I can vary the details within reasonable limits without departing from the spirit of my invention.

I am aware that independent drills have been joined together to form a double drill, and make no claim, broadly, to joining two drills together; but,

Having thus fully described my invention, I claim—

1. In a seed-drill, a main wheel provided upon its spokes or upon an inner ring integral therewith with a series of lifters, and upon the inner side of its rim with a series of cams midway between the lifters, as described, and for the purpose set forth.

2. The main wheel having lifters and cams, as described, in combination with the agitator-arm having a lug adapted to pass between the lifters and cams and be alternately engaged by both, for the purpose set forth.

3. The main wheel having lifters set at an angle to a radius of the wheel, and curved cams upon the inner face of the rim midway between the lifters, in combination with the hopper, a seed-agitator located therein, and an agitator-lever having a lug adapted to engage the lifters and cams, said lug being placed at an angle corresponding with the angle of the lifters, whereby said lug is actuated alternately by the lifters and the cams, but unnecessary friction is avoided.

4. The main wheel having lifters at an angle to a radius of the wheel, and curved cams upon the inner face of the rim midway between the lifters, and the agitator-lever having a lug adapted to engage or to pass between said lifters and cams, in combination with a lever pivoted to the side bar, and adapted to hold said lug midway between said lifters and lugs, whereby the wheel may be rotated without moving the agitator.

5. The hopper, the adjusting-slide having a seed-aperture, and adapted to slide longitudinally of the machine in guides beneath said hopper, and a cut-off adapted to slide at right angles to the adjusting-slide in ways constructed at the top of the conveyer, in combination with an operating-lever and a keeper adapted to hold the lever and cut-off either in the open or closed position.

6. The central bar to which the handles and handle-braces are secured, and which is provided with guides R', in combination with the slotted cross-bars and a set-screw adapted to clamp the cross-bars to the guides, whereby the drills may be adjusted at any distance apart, and the entire device is firmly braced and steadied.

7. The central bar, the handles, and handle-braces secured thereto, in combination with the slotted adjusting-bars, one pair of which is secured to the upper side of the side bars of the drills, and the other pair to the lower side thereof, and guides having grooves for the central bar, and transversely thereto grooves for the adjusting-bars, one pair of which are arranged above and the other below the central bar, as and for the purpose set forth.

8. The swinging frame P', carrying the presser-roller, and having a scraper, P³, and notched lugs P⁵, in combination with cross-rod P⁴, which rests on the lower side of the notch when the handles are pressed down, and against which the upper side rests when the handles are raised, as described, and for the purpose set forth.

9. The independent drills having adjusting-bars Q, in combination with the central bar to which the handles and handle-braces are pivoted, as shown, and having guides in which the adjusting-bars slide, and set-screws which hold the parts in place.

In testimony whereof I affix my signature in presence of two witnesses.

EVERETT C. ELLWOOD.

Witnesses:
A. M. WOOSTER,
WM. A. JONES.